United States Patent [19]
Frappier

[11] 4,324,971
[45] Apr. 13, 1982

[54] TORCH HEIGHT ACQUISITION USING ARC TRANSFER

[75] Inventor: Michael B. Frappier, West Lebanon, N.H.

[73] Assignee: Thermal Dynamics Corporation, West Lebanon, N.H.

[21] Appl. No.: 167,095

[22] Filed: Jul. 9, 1980

[51] Int. Cl.³ .............................................. B23K 9/06
[52] U.S. Cl. ...................... 219/121 PV; 219/121 PW; 219/121 P; 219/124.02; 219/130.4
[58] Field of Search ............. 219/121 PV, 121 PW, 219/121 T, 121 R, 121 J, 76.16, 124.02, 124.03, 130.4; 213/231.3–231.5

[56] References Cited

U.S. PATENT DOCUMENTS

| | | | |
|---|---|---|---|
| 1,648,563 | 11/1927 | Morton | 219/124.02 |
| 1,784,015 | 12/1930 | Lane et al. | 219/124.02 |
| 2,929,917 | 3/1960 | Kruml et al. | 219/124.02 |
| 3,711,058 | 1/1973 | Weman | 219/130.4 |
| 4,017,707 | 4/1977 | Brown et al. | 219/124.02 |
| 4,101,754 | 7/1978 | Fischer | 219/121 PV |
| 4,170,727 | 10/1979 | Wilkins | 219/121 PV |
| 4,203,022 | 5/1980 | Couch, Jr. et al. | 219/124.02 |

FOREIGN PATENT DOCUMENTS 50-8701  4/1975  Japan ................. 219/121 P

*Primary Examiner*—B. A. Reynolds
*Assistant Examiner*—M. H. Paschall
*Attorney, Agent, or Firm*—Sughrue, Mion, Zinn, Macpeak & Seas

[57] ABSTRACT

Initial torch height is acquired by moving a plasma torch toward a workpiece while operating in a pilot mode. The downward movement of the torch is halted when a current sensing relay coupled to the main arc supply senses the transference of the main arc.

In a preferred embodiment, the downward movement of the torch is continued until a fixed period of time has passed after the main arc ignition has been sensed.

15 Claims, 6 Drawing Figures

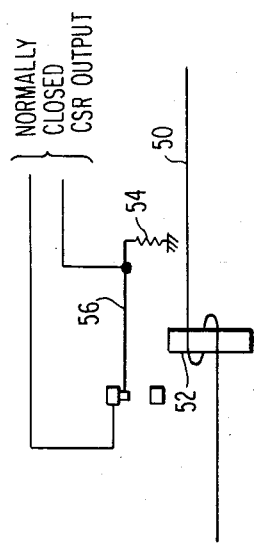
FIG. 4
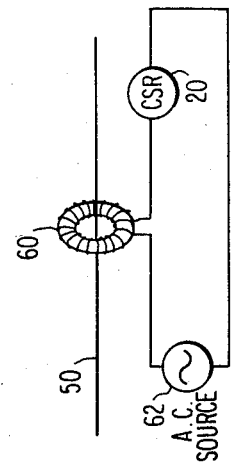
FIG. 5
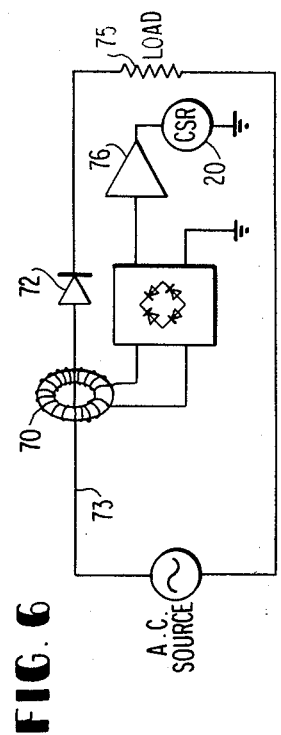
FIG. 6
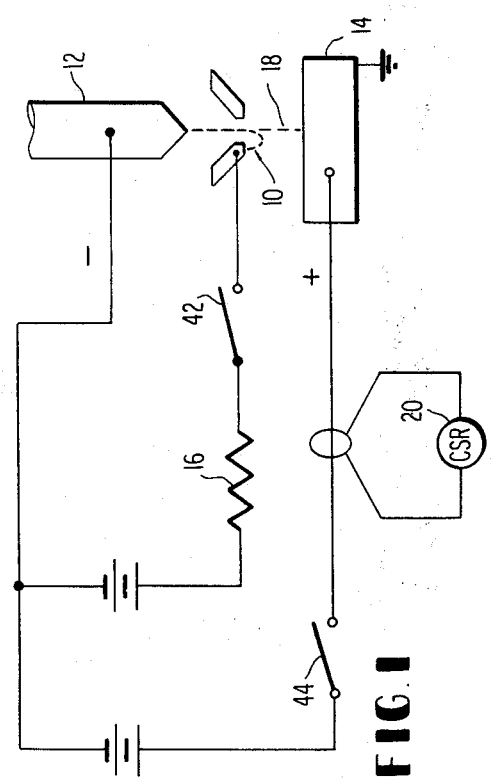
FIG. 1
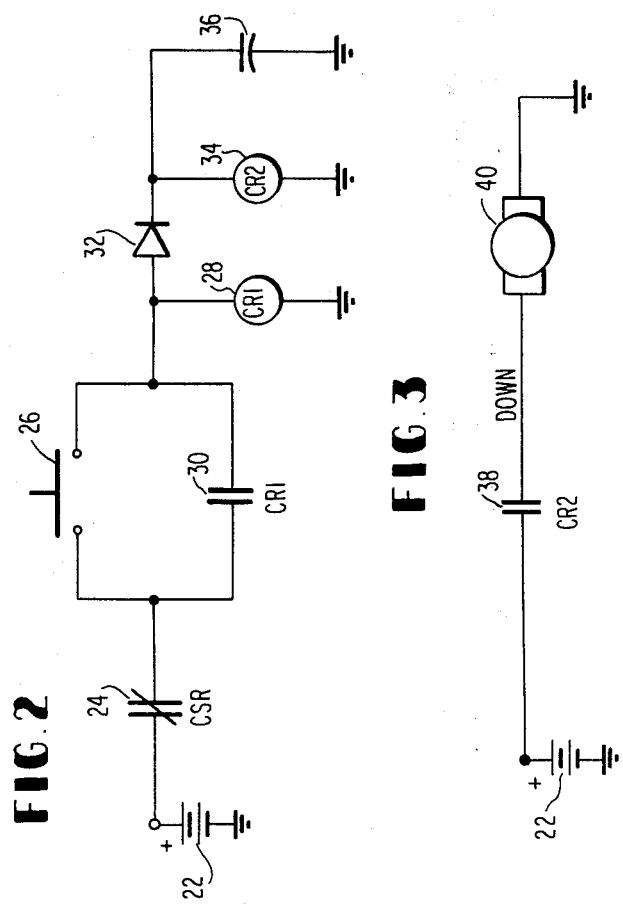
FIG. 2
FIG. 3

TORCH HEIGHT ACQUISITION USING ARC TRANSFER

BACKGROUND OF THE INVENTION

This invention is related to plasma cutting and welding torches, and more particularly to a technique for acquiring an initial torch height.

Plasma torches, also known as electric arc torches, are commonly used for cutting, welding and spray bonding of work pieces, and operate by directing a plasma consisting of ionized gas particles towards a workpiece. In the operation of a typical plasma torch, such as illustrated in U.S. Pat. No. 3,813,510, assigned to the same assignee as the present invention, a gas to be ionized is supplied to the end of the torch. A sufficiently high voltage is applied between a welding tip and an electrode at the end of the torch to cause a spark gap to jump therebetween, thus heating and ionizing the gas. A pilot, or non-transferred, arc is established by maintaining a d.c. voltage between the electrode and welding tip.

The pilot arc extends a distance from the torch tip dependent upon the power in the gap, which is in turn dependent on factors such as the pilot current, pilot voltage, torch nozzle size and, to a lesser extent, plasma gas pressure. This pilot arc provides a source of light which enables the operator to see the proper position for the torch before starting the cutting or welding operation and also provides a means for establishing a main arc. As the torch is brought towards the workpiece, the main cutting or welding arc will jump from the electrode to the workpiece since the impedance of the current path through the pilot arc to the workpiece is lower than that through air to the workpiece.

The quality of the cut in the workpiece will depend on a number of factors, including the arc current, the type of metal, the thickness of the metal, the torch height above the metal and the torch speed along the workpiece. For a given workpiece, the current, height and torch speed are set to determine the quality of the cut. Several techniques have been developed for acquiring an initial cutting height and maintaining this height during the cutting operation. None of these techniques, however, has proven entirely satisfactory for operation both in air and under water.

With mechanical sensing devices, a probe connected to a switch extends downwardly along the side of the torch body. When the torch reaches a specific height, the probe contacts the workpiece and activates the switch, interrupting the downward movement of the torch. Such devices are unsatisfactory in that the probe must be adjusted mechanically to provide the correct torch height, the probe drags along the plate during the cut and is subject to damage from the cutting debris, and the probe is offset from the center of the arc path and will not sense height correctly on a badly warped plate.

Inductive sensing devices typically comprise a large ring positioned around the torch. The inductor is part of an oscillator which changes frequency in response to changes in the inductance, and the frequency changes are used to control the torch height. Significant disadvantages of inductive sensing devices are their considerable bulk and the likelihood of damage from cutting debris.

In capacitive torch height control devices, the workpiece is used as one plate of a capacitor in an oscillator circuit. The frequency of the oscillator circuit changes with torch-to-workpiece distance, and this frequency is compared to a reference frequency to determine the proper position of the torch. These devices are disadvantageous in that electrical noise caused by the arc can interfere with the accuracy of operation and, like the mechanical and inductive sensing devices, they are offset from the cutting path and are subject to damage from cutting debris. Further, in many instances, the work piece to be cut is under water. Since the water is contaminated with cutting debris, it will be conductive to some extent and may look very much like the workpiece to the capacitive sensing system. Thus, the torch may initially set up above the surface of the water.

In a gas backpressure height control system, the gas backpressure in the torch is monitored for changes which occur as the torch approaches the workpiece. A significant disadvantage of the backpressure height control is that the gas backpressure will change not only as the torch approaches the workpiece but when it approaches other objects as well. Thus, when the work piece is under water, the gas backpressure will change as the torch approaches the surface of the water, and the downward movement of the torch may stop slightly above the water surface rather than slightly above the workpiece.

It is known that the main arc voltage existing between the torch and the work piece during the cutting or welding operation is a function of several variables, one of which is the torch height above the workpiece. Since it is possible to maintain the additional variables, e.g. a gas pressure, arc current, horizontal travel speed, type and thickness of the workpiece, etc., substantially constant during the cutting operation, height control systems have been developed which utilize the detected main arc voltage to monitor and control the torch height. Such systems, however, cannot be used to regulate height until after the cutting arc has started and stabilized and a cut has been made. This is due to transients which exist in the arc voltage until the arc stabilizes. Further, arc voltage sensing systems can only regulate torch height after they are properly set and a reference voltage is provided for comparing the sensed arc voltage. Thus, it is still necessary to acquire the initial torch height in order to determine the proper reference voltage.

A technique for acquiring initial torch height in an arc voltage torch height control system is disclosed in U.S. Pat. No. 4,170,727, assigned to the same assignee as the present invention. As disclosed therein, the power supply bridge voltage during the time of the non-transferred, or pilot, arc is used to acquire the initial height. This pilot arc voltage will increase as the torch approaches the workpiece, and the downward movement of the torch is stopped when the pilot arc voltage reaches a predetermined level. Again, however, the pilot arc voltage is dependent upon the capacitance between the torch and the workpiece and, as in the above described capacitive-type height control systems, the conductive water surface will result in faulty operation if the workpiece is under water.

SUMMARY OF THE INVENTION

It is an object of the present invention to provide an initial torch height acquisition system which operates satisfactorily both under water and in air.

It is a further object of this invention to provide such a system which is simple in both design and operation and which achieves highly repeatable results.

Briefly, these and other objects are achieved by an initial torch height acquisition system based upon the height at which the main arc transfers to the workpiece. According to the present invention, the torch is moved downwardly toward the workpiece while operating in the pilot mode, and the downward movement of the torch is interrupted in response to the main arc transferring to the workpiece. Since the main arc will always transfer to the workpiece at the same height if factors such as pilot current, pilot voltage, torch nozzle size and plasma gas pressure are maintained substantially constant, the transferring of the main arc can be used to consistently indicate a fixed torch stand-off. A current sensing relay in the main arc supply circuitry is used to control normally closed contacts in the motor drive power supply circuitry. When the main arc transfers, the current sensing relay is energized to thereby cut off the current supply to the drive motor and halt the downward movement of the torch. A capacitor is preferably provided to delay the shutdown of the drive motor for a fixed additional period of time in order to ensure arc transfer in the subsequent cutting or welding cycle. Magnetic, saturated core inductor, current transformer and Hall effect sensors are examples of the sensing technique which may be employed in the current sensing relay.

BRIEF DESCRIPTION OF THE DRAWINGS

The invention will be more clearly understood from the following description in conjunction with the accompanying drawings in which:

FIG. 1 is a brief schematic diagram illustrating the pilot and main arc current paths in a plasma torch;

FIG. 2 is a diagram of the torch motor drive control circuitry according to the present invention;

FIG. 3 is a brief schematic diagram illustrating the coupling of the circuitry of FIG. 2 to the torch drive motor;

FIG. 4 is a brief schematic diagram of a magnetic sensor which may be used to detect arc transfer in the system according to the present invention;

FIG. 5 is a brief schematic diagram of a saturated core inductor which may be used to detect arc transfer in the system according to the present invention; and FIG. 6 is a brief schematic diagram of a current transformer which may be used to detect arc transfer in the system according to the present invention.

DETAILED DESCRIPTION OF THE PREFERRED EMBODIMENT

This invention is based upon the observation that, as the torch is brought close to the workpiece while operating in the pilot, or non-transferred arc, mode, the main arc will always transfer at the same height. The factors that have an effect on the arc-transfer distance are the pilot current, pilot voltage, torch nozzle size and, to a lesser extent, the plasma gas pressure. All of these factors affect the distance that the ionized gas stream, produced by the pilot arc, will project from the torch nozzle. When this ionized gas stream contacts the workpiece, an electrical path is established for the main cutting or welding current. Thus, with all of the above conditions maintained substantially constant, a consistent torch stand-off can be obtained.

Referring to FIG. 1, a brief schematic diagram of essential components of the pilot and main arc d.c. supply circuits is shown. The torch includes a weld tip 10 and a cathode 12 and, during the non-transferred arc operation, the d.c. voltage between the tip and cathode is at a level sufficient to maintain a pilot arc therebetween. As the torch moves toward the workpiece 14, the pilot arc will contact the workpiece and will establish a low impedance path between the electrode and workpiece. Due to the impedance 16 in the pilot arc d.c. supply path, the workpiece will present a lower impedance to the arc and a main arc 18 will then be established between the torch and workpiece. It should be appreciated that the torch and power supply circuitry are significantly more sophisticated than as shown in the simplified schematic diagram of FIG. 1. However, the details of the torch and power supply circuitry not shown in FIG. 1 are well known in the art, and only those components will be illustrated as are necessary for a proper understanding of the present invention.

According to the present invention, the downward movement of the torch is to be stopped at the time of main arc transfer, and this main arc transfer is preferably detected by a current sensing relay (CSR) 20. FIGS. 2 and 3 briefly illustrate the circuitry used to control the downward movement of the torch height motor. In FIG. 2, reference numeral 22 designates a d.c. power source; 24, the normally-closed contacts of relay 20 in FIG. 1; 26, a normally-open push-button switch; 28, the control coil of a current-activated relay; 30, the normally-open contacts of relay 28; 32, a diode; 34, the control coil of a second current-activated relay; 36, a capacitor; 38, the normally-open contacts of the second relay 34; and 40, the drive motor for upward and downward movement of the torch.

Referring collectively to FIGS. 1–3, a torch height acquisition sequence will now be described. At the beginning of the height acquisition sequence, the torch is at some distance above the workpiece 14. The push-button 26 is depressed to allow current to flow from the d.c. source 22 through the contacts 24, switch 26 and diode 32 to charge capacitor 36. The current also flows to ground through the control coils of relays 28 and 34. At the same time, conventional logic circuitry (not shown) within the power supply causes the closure of switches 42 and 44. With switch 42 closed, the d.c. voltage between the tip 10 and electrode 12 will be sufficient to maintain a pilot arc therebetween.

Current flowing through the relay 28 will result in closure of contacts 30. It will be appreciated that the arrangement of relay 28 and its contacts 30 results in a latching operation since the current flowing through contacts 30 will maintain the relay 28 in its energized state even when the push-button 26 is released. The current flowing through the relay 34 results in closure of contacts 38 to thereby energize the drive motor 40 and results in downward movement of the torch.

As the torch approaches the workpiece 14, the pilot arc will contact the workpiece and establish a low impedance path between the electrode and workpiece, and due to the impedance 16 in the d.c. pilot arc supply path, the workpiece will present a lower impedance path for the arc. Accordingly, the arc will transfer to the workpiece, resulting in the establishment of a main cutting or welding arc 18. When the main arc transfers, current will begin flowing in the main arc d.c. supply path, and this current will be sensed by the current sensing relay 20. The activation of relay 20 results in opening of the normally-closed contacts 24, thereby interrupting the flow of current through the relay 28 and unlatching the contacts 30. At this time, conventional logic circuitry (not shown) in the power supply cuts off the pilot and main arc d.c. supply current by opening switches 42 and 44.

Although the flow of current through the relay 28 is cut off by the operation of relay 20, the relay 34 is maintained in an energized state for an additional period of time by the charge on capacitor 36. Diode 32 prevents this capacitor charge from supplying current to the relay 28. The delay provided by capacitor 36 allows the motor 15 to drive the torch downwardly by a fixed incremental amount past the initial arc transfer point in order to ensure that the arc will transfer during the subsequent cutting or welding cycle.

As soon as the delay capacitor 36 discharges to a level at which it is incapable of maintaining the minimum holding current of relay 34, the contacts 38 will open and the drive motor 40 will stop. At this point, the torch height acquisition sequence is completed and the torch is now ready to cut or weld. After the height acquisition sequence has been completed, the height during the cutting or welding operation will be maintained by the above-described arc voltage sensing method. Since the proper initial height has been achieved, the arc reference voltage to be used for torch height control during the cutting or welding operation can be obtained by a sample and hold circuit in the same manner as disclosed in the above-mentioned U.S. Pat. No. 4,170,727.

A significant advantage of the initial height acquisition according to the present invention is that it is not adversely affected by the main drawback of most other methods—the conductivity of the water in which the work piece may be immersed. In a typical system, the current necessary to activate the current sensing relay 20 will be in excess of 20 amperes. The conductivity of water, even when saturated with cutting debris, will not be sufficient to conduct this necessary level of current and, further, the sensitivity of the relay 20 could be adjusted if necessary. Thus, the torch height acquisition technique according to the present invention operates equally well both in air and under water. Due to energy absorption by the water, the pilot arc may extend a lesser distance in water than in air. Thus, although the acquired torch height will be consistent in air and consistent under water, it may be slightly higher in air. In order to compensate for this, resistor 16 may be changed or a switch may be provided to select one of two resistances 16.

The current sensor used in the relay 20 may be any one of a variety of well-known types, some examples of which will now be described. As shown in FIG. 4, a few turns of the current-carrying conductor 50 may be wrapped about an iron core 52. The switch contacts can be maintained in a normally closed position as shown in FIG. 4 by the operation of spring 54, but the movable switch contact 56 will be attracted to open the CSR contacts when the main arc current flows through the conductor 50.

As shown in FIG. 5, the main current carrying conductor 50 may be passed through a torroidal inductor 60. An AC source 62, the coil 60 and the electromagnetic coil in the relay 20 which is used to open the switch contacts can all be connected in series. The inductive reactance of the coil 60 is such that there is insufficient current flowing in the series circuit to activate the relay 20. When the main arc current flows through the conductor 50, the magnetic field surrounding the conductor 50 saturates the torroidal coil 62 and reduces its inductive reactance. This will allow sufficient current to flow to activate the current sensing relay 20.

A still further alternative for sensing the main arc current is shown in FIG. 6. In the sensing techniques of FIGS. 4 and 5, the current flowing in a d.c. line was sensed. This d.c. supply current, however, may typically be generated from the combination of an a.c. source and a bridge rectifier. In FIG. 6, diode 72 represents one diode of a bridge rectifier and 73 represents one of the lines supplying an a.c. signal to the rectifier, and a toroid 70 can be placed around an a.c. line 73 immediately prior to the output rectifier 72. When current is drawn through the rectifier by the main arc represented by load impedance 75, a small a.c. signal will be induced in the toroid, and this signal can then be rectified and amplified to drive the current sensing relay. If the same a.c. line 73 is used to supply current to both the pilot and main arc, the sensitivity of amplifier 76 may be adjusted to respond only to the larger main arc current.

Other current sensing techniques are also available, such as a well-known Hall effect sensor placed next to the current carrying conductor 50 to sense the magnetic field surrounding the conductor 50 when the main arc current begins to flow.

The above-described initial torch height acquisition system is highly advantageous in that it will work equally well both in air and under water. It is also quite simple and, as long as the required parameters are controlled so as to maintain a substantially constant pilot arc extension distance, the torch will always stop at the same distance from the workpiece.

What is claimed is:

1. A plasma torch system of the type wherein a non-transferred arc is generated between a torch cathode and a torch tip, said system further being of the type wherein a torch main arc operating height is initially acquired and is then maintained during a cutting or welding operation, said system comprising a means for lowering said torch toward a workpiece while said non-transferred arc is being generated to establish a main arc between said torch and workpiece, the improvement comprising:
    means for sensing establishment of said main arc, said sensing means producing an electrical indicating signal upon establishment of said main arc;
    means for stopping the downward movement of said torch in response to said electrical indicating signal, the height at which said torch is stopped constituting said main arc operating height.

2. A plasma torch system as defined in claim 1, wherein said means for lowering includes a motor for moving said torch downwardly in response to a supply current, said means for stopping comprising:
    detecting means for detecting the establishment of said main arc; and
    interrupting means for interrupting said supply current to said motor in response to detection of said main arc.

3. A plasma torch system as defined in claim 2, wherein said interrupting means comprises a first relay having a control portion and having switch contacts, and wherein said means for lowering includes energizing means for energizing said control portion, said switch contacts being connected in series with said motor and being closed when said control portion is energized; and means for deenergizing the control portion of said first relay to thereby open said first relay switch contacts.

4. A plasma torch system as defined in claim 3, further comprising delay means for delaying the deenergization of said relay for a fixed time period after detection of said main arc.

5. A plasma torch system as defined in claim 1, wherein said delay means comprises a capacitor coupled to the cathode of said diode for supplying energizing current to said first relay control portion for a fixed period of time after the opening of said second relay switch contacts.

6. A plasma torch system as defined in claim 3, wherein said means for energizing said first relay control portion comprises a power source and normally closed current sensing relay contacts for passing current from said power source to said first relay control portion, and wherein said means for interrupting comprises means for opening said normally closed current sensing relay contacts to interrupt the supply of energizing current to said first relay control portion.

7. A plasma torch system as defined in claim 6, wherein said means for energizing further comprises:

a second relay having a control portion and switch contacts, said second relay switch contacts being closed when said second relay control portion is energized and said second relay switch contacts being open when said second relay control portion is de-energized, said second relay switch contacts having a first terminal coupled to said current sensing relay contacts and a second terminal;

a diode having an anode coupled to the second terminal of said second relay switch contacts and the control portion of said second relay, and a cathode coupled to said first relay control portion; and a normally open push-button switch coupled in parallel with said second relay switch contacts, whereby said first relay control portion will be energized in response to depression of said push-button switch to commence downward movement of said torch and will remain energized after release of said push-button switch until the opening of said current sensing relay contacts.

8. A plasma torch system as defined in claim 6, wherein said current sensing relay contacts comprise an input switch contact, an output switch contact, a ferromagnetic member movable between a first position in which it couples said input and output switch contacts and a second position in which said input and output switch contacts are open, and means for biasing said ferromagnetic member toward said first position, said means for opening comprising a current sensing relay control portion which, when energized, moves said ferromagnetic member to said second position.

9. A plasma torch system as defined in claim 8, further comprising a conductor for carrying current during said main arc, sensing means for sensing current in said conductor, and current sensing relay energizing means for energizing said current sensing relay control portion in response to the sensing of current in said conductor.

10. A plasma torch system as defined in claim 9, wherein said sensing means comprises a Hall effect sensor adjacent said conductor.

11. A plasma torch system as defined in claim 9, wherein said means for sensing comprises a torroidal coil surrounding said conductor and said current sensing relay energizing means comprises an AC source, said AC source, torroidal coil and current sensing relay control portion being coupled in series, the inductive reactance of said coil being reduced by said current in said conductor to thereby permit sufficient energizing current to flow from said AC source to said current sensing relay control portion.

12. A plasma torch system as defined in claim 8, further comprising a conductor for carrying current during said main arc, said current sensing relay control portion being coupled in series with said conductor whereby the current in said conductor energizes said current sensing relay control portion when said main arc is established.

13. A plasma torch system as defined in claim 8, further comprising an AC power source for providing power for said main arc, a conductor coupled to said AC power source for conducting current when said main arc is established, said means for sensing comprising a torroidal coil having input and output terminals and surrounding said conductor, and said energizing means comprising a rectifier coupled to the input and output terminals of said torroidal coil and an amplifier coupled to the output of said rectifier, the output of said amplifier energizing said current sensing relay control portion in response to current flowing through said conductor.

14. In a plasma torch system of the type in which a non-transferred arc is generated between a torch electrode and torch tip, said system further being of the type wherein a torch main arc operating height is initially acquired and is then maintained during torch operation, a method of initially acquiring said torch main arc operating height comprising the steps of:

moving said torch downwardly toward a workpiece during the generation of said non-transferred arc;

sensing establishment of said main arc and producing an electrical indicating signal upon establishment of said main arc; and stopping the downward movement of said torch in response to said electrical indicating signal, the height at which downward movement is stopped constituting said torch main arc operating height.

15. The method according to claim 14, wherein said stopping step comprises continuing the downward movement of said torch for a fixed period of time after the establishment of said main arc and stopping said torch at height slightly lower than the height at which said main arc is first established.

* * * * *